US010846465B2

(12) United States Patent
Peacock et al.

(10) Patent No.: US 10,846,465 B2
(45) Date of Patent: Nov. 24, 2020

(54) INTEGRATING AN APPLICATION FOR SURFACING DATA ON AN EMAIL MESSAGE PANE

(71) Applicant: Microsoft Technology Licensing, LLC, Redmond, WA (US)

(72) Inventors: Andrew James Peacock, Seattle, WA (US); Shahil Soni, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 15/198,362

(22) Filed: Jun. 30, 2016

(65) Prior Publication Data

US 2018/0004373 A1 Jan. 4, 2018

(51) Int. Cl.
*G06F 3/00* (2006.01)
*G06F 40/166* (2020.01)
*H04L 12/58* (2006.01)
*G06F 40/30* (2020.01)

(52) U.S. Cl.
CPC ............ *G06F 40/166* (2020.01); *G06F 40/30* (2020.01); *H04L 51/22* (2013.01)

(58) Field of Classification Search
CPC .... G06F 3/0484; G06F 3/0481; G06F 3/0482; G06F 17/24; H04L 51/22
See application file for complete search history.

(56) References Cited

U.S. PATENT DOCUMENTS

| 8,321,801 | B2 | 11/2012 | Chaudhri et al. | |
|---|---|---|---|---|
| 8,875,029 | B1* | 10/2014 | Naidu | G06Q 10/10 715/752 |
| 9,009,152 | B2 | 4/2015 | Lai et al. | |
| 9,043,403 | B2 | 5/2015 | Schnitman et al. | |
| 9,070,117 | B2 | 6/2015 | Rideout et al. | |
| 9,104,294 | B2 | 8/2015 | Forstall et al. | |
| 2008/0083003 | A1 | 4/2008 | Biniak et al. | |
| 2008/0162439 | A1 | 7/2008 | Bosarge et al. | |
| 2008/0189622 | A1* | 8/2008 | Sanchez | G06Q 10/06 715/752 |
| 2009/0024944 | A1 | 1/2009 | Louch et al. | |
| 2010/0153219 | A1 | 6/2010 | Mei et al. | |
| 2011/0191316 | A1* | 8/2011 | Lai | G06F 7/10 707/706 |
| 2011/0252103 | A1* | 10/2011 | Beyer | G06Q 10/107 709/206 |
| 2012/0010995 | A1* | 1/2012 | Skirpa | G06F 3/0481 705/14.49 |

(Continued)

OTHER PUBLICATIONS

Justin, "Interactive Shopping Widget for Email", Published on: Feb. 11, 2015, Available at: http://freshinbox.com/blog/shopping-in-email-add-to-cart/.

(Continued)

*Primary Examiner* — Anil N Kumar

(74) *Attorney, Agent, or Firm* — Christopher J. Volkmann; Kelly, Holt & Christenson, PLLC

(57) ABSTRACT

An electronic mail (email) system generates an email user interface display for composing an email message. A context-sensitive widget display is surfaced, on the user interface display, in-line with other message content. A widget that generates the widget display interacts with a remote data service to surface data from the remote data service, on the widget display.

20 Claims, 13 Drawing Sheets

(56) References Cited

U.S. PATENT DOCUMENTS

| | | | |
|---|---|---|---|
| 2012/0185781 A1* | 7/2012 | Guzman | G06Q 10/107 |
| | | | 715/752 |
| 2013/0097526 A1* | 4/2013 | Stovicek | G06Q 10/107 |
| | | | 715/752 |
| 2014/0245175 A1* | 8/2014 | Rydenhag | H04L 51/08 |
| | | | 715/752 |
| 2015/0019665 A1 | 1/2015 | Linner et al. | |
| 2015/0100648 A1 | 4/2015 | Shmarovez et al. | |
| 2015/0244655 A1* | 8/2015 | Vohra | H04L 51/18 |
| | | | 715/752 |
| 2016/0026439 A1 | 1/2016 | Zaydman et al. | |

OTHER PUBLICATIONS

Robbins, Mark, "Punched card coding: the secret of interactive email", Published on: Oct. 19, 2015, Available at: http://www.webdesignerdepot.com/2015/10/punched-card-coding-the-secret-of-interactive-email/.

Justin, "Burberry's Interactive Scarf Personalizer Email", Published on: Dec. 10, 2015, Available at: http://freshinbox.com/blog/burberrys-interactive-scarf-personalizer/.

* cited by examiner

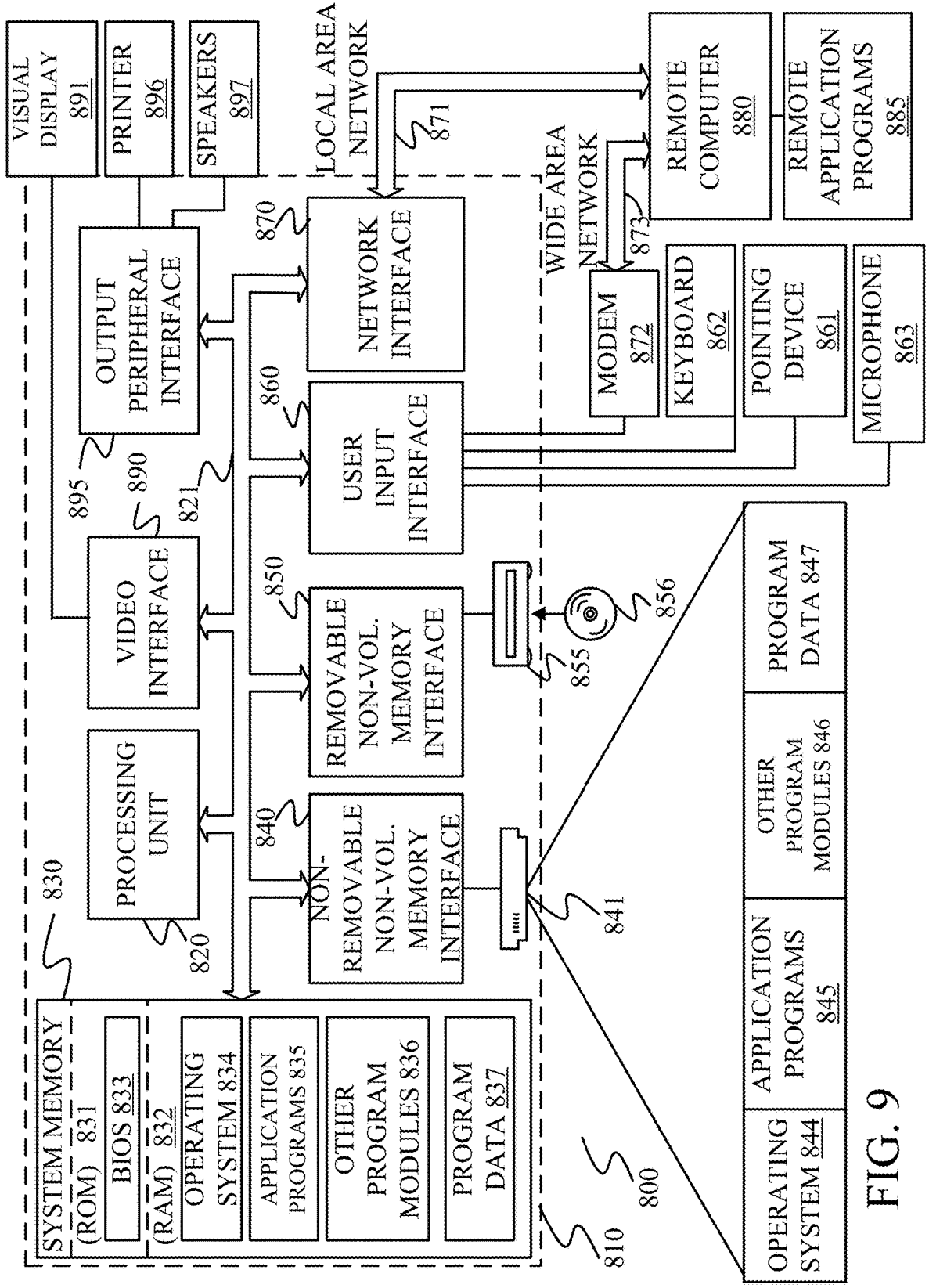

INTEGRATING AN APPLICATION FOR SURFACING DATA ON AN EMAIL MESSAGE PANE

BACKGROUND

Computing systems are currently in wide use. Some such computing systems include electronic mail systems. Others include systems that interact with remote data services, or data sources, to continuously or repeatedly return data.

Computing systems often run different types of applications. One such application is a relatively small application that can be installed into a web page or a service page. This type of application often interacts with a remote service or data source in order to obtain and display data from the remote source. For example, a weather application may repeatedly surface and update weather forecast data on a web page or service page. This type of application is often referred to as a widget. It automatically obtains the data from the remote source and surfaces it in a display. The widget may have relatively limited functionality compared to other applications, and can be installed and executed within a webpage by an end user. A widget is often a transient or auxiliary application, meaning that it only occupies part of a web page and generates a display based on information fetched from other web sites or data sources, and displays that data in place, on the portion of the web page that is occupied by the widget display.

Users of such systems often communicate using electronic mail systems and attempt to incorporate data that is returned using the widget that interacts with the remote data service. This often requires a user who is composing an electronic mail (email) message to navigate away from the email user interface display to a user interface for the widget. The user then interacts with the widget to obtain data from the remote service, and then attempts to incorporate that data into the message content in the email message being composed.

By way of example, assume that a first user is generating an email message to a second user, and attempting to set up a travel itinerary. It may be that the first user uses an application (or widget) that accesses data from a weather service in order to obtain weather forecast data for a desired location. The first user may then review the weather forecast data and attempt to incorporate it, by typing a representation of it, into a message body in the email message and sending the message to the second user. Later, if the weather forecast data changes, it is not uncommon for the first user to generate yet another email message to the second user, including information about the updated weather forecast.

This is just one example of how a user may use an email system and an application that accesses a remote data service or data source. There are a wide variety of other scenarios and examples where users use such systems and applications.

The discussion above is merely provided for general background information and is not intended to be used as an aid in determining the scope of the claimed subject matter.

SUMMARY

An electronic mail (email) system generates an email user interface display for composing an email message. A context-sensitive widget display is surfaced, on the user interface display, in-line with other message content. A widget that generates the widget display interacts with a remote data service to surface data from the remote data service, on the widget display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 9 is a block diagram of one example of a computing environment that can be used in the architecture, shown in the previous Figures.

DETAILED DESCRIPTION

Figure 1:
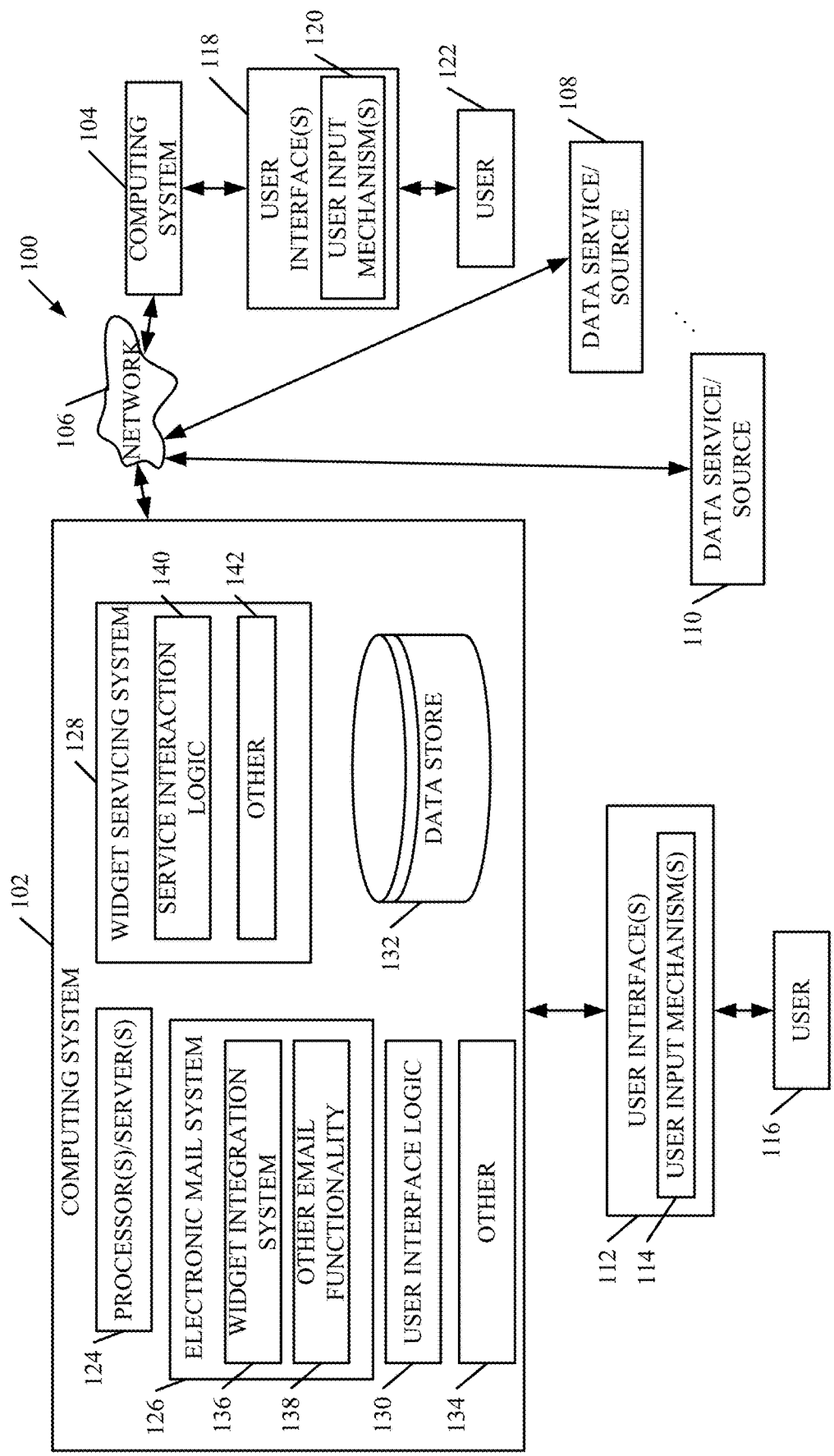
FIG. 1 is a block diagram of one example of a computing system architecture.

FIG. 1 is a block diagram of one example of a computing system architecture 100. Architecture 100 is shown with computing systems 102 and 104 in communication with one another over network 106. Architecture 100 also shows that, in one example, computing systems 102 and 104 can communicate with a plurality of different remote data services or data sources 108-110. It will be noted that, while FIG. 1 only shows two computing systems 102 and 104 and two remote data services or data sources 108-110 in communication with one another, there can be additional computing systems and data services or sources as well. Those shown in FIG. 1 are shown for the sake of example only.

Computing system 102 illustratively generates user interfaces 112 with user input mechanisms 114 for interaction by user 116. User 116 illustratively interacts with user input mechanisms 114 in order to control and manipulate computing system 102. Similarly, computing system 104 is shown generating user interfaces 118 with user input mechanisms 120 for interaction by user 122. User 122 illustratively interacts with user input mechanisms 120 in order to control and manipulate computing 104.

Network 106 can be any of a wide variety of different kinds of networks. It can be a wide area network, a local area network, a cellular network, a near field communication network, or another network or a combination of networks.

Computing systems 102 and 104 illustratively run applications. Some applications may communicate over network 106 with data services or sources 108-110 in order to repeatedly obtain data from them, and update displayed data. The data may be live data or streaming data that is constantly received by, and presented to, an end user while the data is being delivered by the remote data service or data source 108-110.

Computing system 102 illustratively includes one or more processors or servers 124, electronic mail (email) system 126, widget servicing system 128, user interface logic 130, data store 132, and it can include other items 134. Electronic mail system 126, itself, illustratively includes widget integration system 136 and it can include a wide variety of other email functionality 138. Widget servicing system 128, itself, illustratively includes service interaction logic 140 and it can include other items 142. It will also be noted that computing systems 102 and 104 can be similar systems. However, they can be different as well. For purposes of the present description, it will be assumed that they are similar systems, and the description will proceed under that assumption. That is made for the sake of example only and the two systems can be different as well.

Before describing the overall operation of architecture 100 in more detail, a brief overview of some of the items in architecture 100, and their operation, will first be provided. User interface logic 130 in computing system 102 illustratively receives inputs from other items in computing system 102 and generates user interfaces 112 and also detects user inputs through mechanisms 114. Email system 126 illustratively allows user 116 to compose, send and receive electronic mail messages and attachments and perform other email functions, such as arrange folders, add and delete contacts or recipients, etc. Widget servicing system 128 is illustratively used by widgets that may be running in electronic mail system 126, to repeatedly obtain data from data services or sources 108-110, for display within email interfaces in email system 126. Thus, widget integration system 136 in email system 126 may integrate a widget (by installing it into an email message display), and run it, in the display in electronic mail system 126. The widget display is illustratively auxiliary to the email display that it is installed into and thus only displays its data on the portion of the email message display that it occupies, which may be relatively small and is less than the entire email message display. When that widget needs data, it may use service interaction logic 140 in widget servicing system 128 in order to automatically call or otherwise access one or more of the remote data services or sources 108-110 to obtain that data. By automatically it is meant that it does this without user input, except perhaps to authorize or initiate running the widget.

Figure 2:
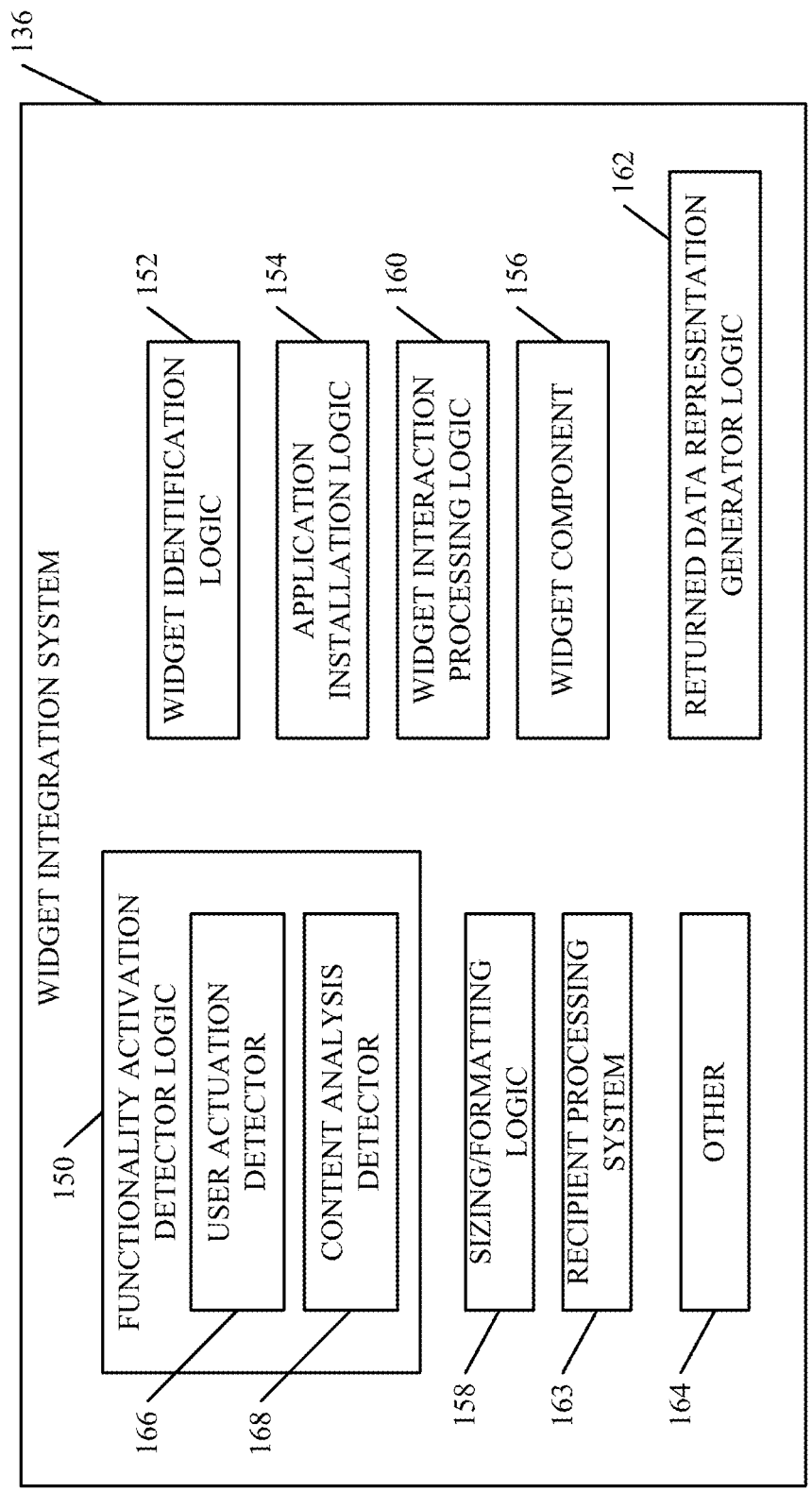
FIG. 2 is a block diagram of one example of a widget integration system, in more detail.

FIG. 2 is one example of a more detailed block diagram of widget integration system 136. In the example shown in FIG. 2, widget integration system 136 illustratively includes functionality activation detector logic 150, widget identification logic 152, application installation logic 154, widget component 156, widget sizing/formatting logic 158, widget interaction processing logic 160, returned data representation generator logic 162, recipient processing system 163, and it can include other items 164. Functionality activation detector logic 150, itself, can include user actuation detector 166 and content analysis detector 168. Again, before describing the operation of architecture 100 (shown in FIG. 1) and the widget integration system 136 (shown in FIG. 2) in more detail, a brief overview of some of the items in system 136, and their operation, will first be provided.

Functionality activation detector logic 150 illustratively detects when the functionality of widget integration system 136 is activated. User actuation detector 166 detects user actuation of an actuator that explicitly activates the functionality of system 136, and which may be displayed on an email user interface display. Content analysis detector 168 illustratively detects activation of system 136 based on the context or content of a message being displayed or composed in email system 126. For instance, detector 168 may include natural language understanding or natural language processing components (or have access to them) to detect when the content of an email message, or a conversation, indicates that the functionality of widget integration system 136 should be activated. These are examples only.

Widget identification logic 152 then identifies a particular widget that may be integrated into the email message, based upon the content of the email message being composed, or the conversation displayed, or other content or context information. Application installation logic 154 then installs the widget (which is an application) into a message display in the email system 126 so that it generates a widget display that surfaces data it retrieves, in-line with the message content of the email message being displayed. Widget component 156 illustratively runs the widget so that it continuously or repeatedly obtains data from the remote data source or data service 108-110 that it is configured to interact with. Returned data representation generator logic 162 illustratively generates a visual representation of that data and uses sizing/formatting logic 158 to size and format the representation, and to locate it on the email user interface display, in-line with other message content.

Some widgets also surface one or more user input mechanisms with which a user can interact. In those scenarios, widget interaction processing logic 160 illustratively detects user interaction with those mechanisms on the widget and either controls email system 126 to perform an action based on the detected interaction, or passes the detected interaction along to other items in computing system 102 so that they can take appropriate actions.

Recipient processing system 163 illustratively identifies when user 116 receives an email message with an integrated widget. It illustratively generates a user interface with user input mechanisms that allow the recipient to view the widget display generated by the widget. Once displayed, system 136 can process the widget as described above.

Figure 3A:
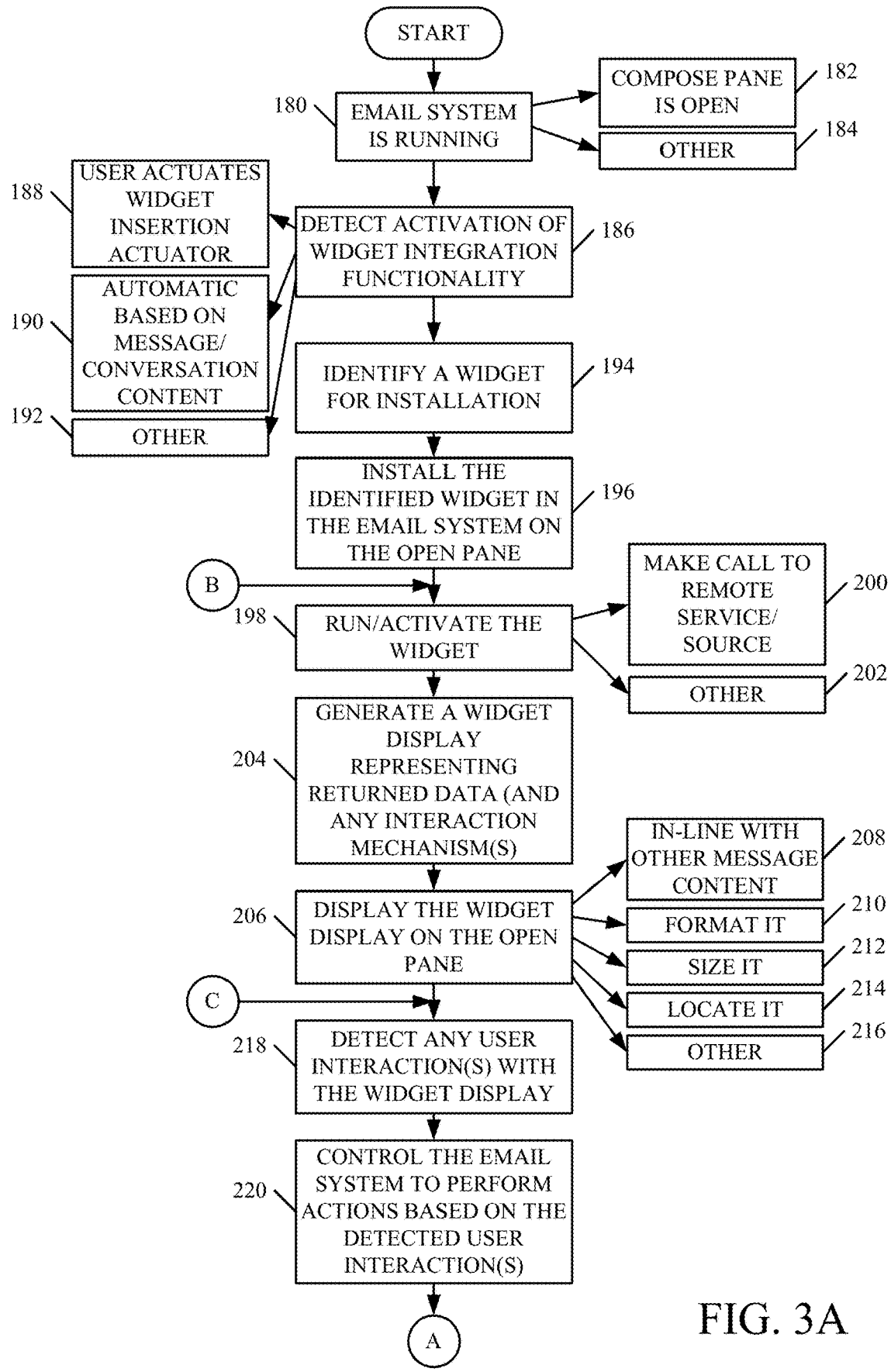
FIGS. 3A and 3B (collectively referred to herein as FIG. 3) show a flow diagram illustrating one example of the operation of the architecture shown in FIG. 1, and the widget integration system shown in FIG. 2, in integrating a widget into an email message.
Figure 3B:
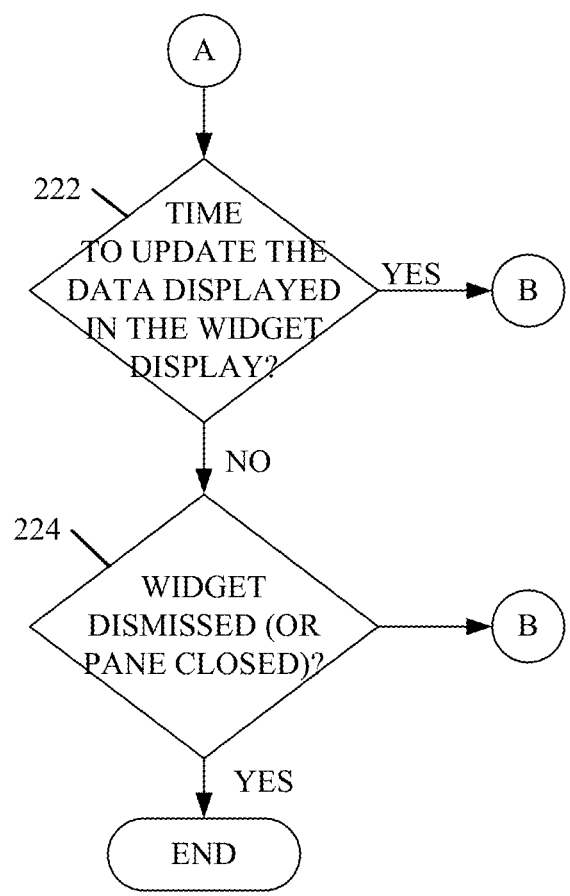

FIGS. 3A and 3B (collectively referred to herein as FIG. 3) show a flow diagram illustrating one example of the operation of architecture 100 and widget integration system 136 in allowing user 116 to integrate a widget into an email message, in-line with other message content in the message. It is first assumed that user 116 has email system 126 open and running on computing system 102. This is indicated by block 180 in the flow diagram of FIG. 3. In one example, user 116 also has the compose pane open on the email user interface, so that the user can author or otherwise compose an email message by entering message content onto the compose pane. This can be done using a keyboard, a keypad, a virtual keyboard, etc. Having the compose pane open on the email user interface display is indicated by block 182 in FIG. 3. The email system can be open and generating a display in other ways as well, and this is indicated by block 184.

Functionality activation detector logic 150 then detects that the functionality of widget integration system 136 should be activated. This is indicated by block 186. In one example, the user interface display has a widget insertion actuator that can be actuated by user 116 in order to activate system 136. Detecting user actuation of the widget insertion actuator is indicated by block 188. In another example, content analysis detector 168 illustratively analyzes the context or content of the message being composed or being displayed and determines that widget integration system 136 should be activated based upon that context or content. For instance, detector 168 may identify other applications that user 116 has open in computer system 102. It may identify the history of inputs or operations performed by user 116 on computing system 102 (such as searching for a destination, looking at a weather site, etc.), or it may identify other context information and determine that the user may wish to insert a widget into the email message. In another example, detector 168 illustratively has natural language understanding or natural language processing components (or has access to them) and generates a linguistic or semantic understanding of the content in the email message, or conversation, being displayed. The content may indicate that the user wishes to have a widget inserted into the email message.

For instance, if the displayed message includes a text string such as "We should find a day when the weather is nice to go to the beach." This may be detected by content analysis detector 168 as a text string that indicates that user 116 may wish to insert a weather service widget that interacts with a weather service to show weather forecast data for one or more different locations, and/or a mapping widget that interacts with a map service to show directions and other location information, into the email message being displayed in email system 126. Thus, this may serve to actuate the functionality of widget integration system 136.

Automatic detection and activation of the functionality of system 136 is indicated by block 190 in FIG. 3. The functionality may be activated in other ways as well, and this is indicated by block 192.

Once the functionality is activated, widget identification logic 152 illustratively identifies a particular widget that is to be inserted in the email message. Again, this can be done based on the subject matter content of the email message being composed or the conversation being displayed, or in other ways. If widget identification logic 152 is unable to identify a particular widget, or if identification is ambiguous relative to a number of different widgets, it may surface a user interface display that allows the user to select or otherwise identify a particular widget (or set of widgets) for insertion. Identifying a widget for installation in electronic mail system 126 is indicated by block 194 in the flow diagram of FIG. 3.

Application installation logic 154 then installs the identified widget in the email system 126 onto the open pane. This is indicated by block 196. For instance, if user 116 has the compose pane in email system 126 open, so that the user can compose an email (or reply to an email), then the identified widget is installed by logic 154 on that particular message display that represents the message being composed.

Once installed, widget component 156 runs or activates the widget, as indicated by block 198. Thus, the widget can interact with the remote service itself, or it can use service interaction logic 140 (shown in FIG. 1) to make a call to a remote data service or data source 108-110 to obtain data. This is indicated by block 200. Component 156 can run or activate the widget in other ways as well, and this indicated by block 202.

Once the data is retrieved, returned data representation generator logic 162 illustratively generates a widget display representing the returned data. In cases where the widget also has user interactive functionality, logic 162 may also generate a display of user input mechanisms that the user can interact with, on the widget display. Generating a widget display representing the returned data and possibly any interaction mechanisms is indicated by block 204.

Sizing/formatting logic 158 then sizes and formats the widget display and locates it on the pane with the email message and displays it at that location. This is indicated by block 206. Sizing/formatting logic 158 illustratively displays the widget display in-line with other message content. This is indicated by block 208. As mentioned above, it can format it as desired, and as indicated by block 210. It can size it and locate it at a desired place as indicated by blocks 212 and 214. For instance, it may locate the widget at the top of the message being authored, at the bottom of the message being authored, at a position of the user's cursor, or elsewhere. In one example, the widget is a transient or auxiliary application so it only shows up and displays its data where it is located, and it may be smaller than the display into which it is inserted. It can display the widget display on the open pane in other ways as well, and this is indicated by block 216.

Widget interaction processing logic 160 then detects any user interactions with the widget display and controls the email system to perform actions based on any detected user interactions. This is indicated by blocks 218 and 220 in FIG. 3. For instance, where the widget is a weather service widget that displays weather forecast data, the user may interact with user input mechanisms on the widget display that allow the user to change the location for the weather forecast data, the date or time for the weather forecast data, etc. Where the widget is an airline data widget that shows flight status information, the user input mechanisms may allow the user to change the flight number of the desired information, to book a ticket or reservation on a particular airline, etc. All of these and a wide variety of other widgets and interactions are contemplated herein.

Widget component 156, in running the widget, illustratively determines whether it is time to update the data displayed in the widget display. This will be determined by the application code for the widget and is indicated by block 222 in the flow diagram of FIG. 3. If so, processing returns to block 198 where the widget can call the remote service, itself, or use service interaction logic 140 to call the appropriate remote data service or data source to obtain the new data.

In one example, the widget display can also be dismissed by user 116. For instance, it may include an actuator that can be actuated by the user to close or otherwise dismiss the widget from the email user interface display. In another example, when the user closes the email message that the widget is installed in, then this also dismisses or closes the widget. The widget can be dismissed or closed in a wide variety of other ways as well. This is indicated by block 224. If it is not closed or dismissed, processing reverts to block 218 where the system detects any user interactions with the widget, controls the email system to perform appropriate actions, and then determines whether it is time to again update the data displayed in the widget display.

FIGS. 4A-4D are examples of a number of different user interface displays. They will be discussed in conjunction with FIGS. 1-3.

Figure 4A:
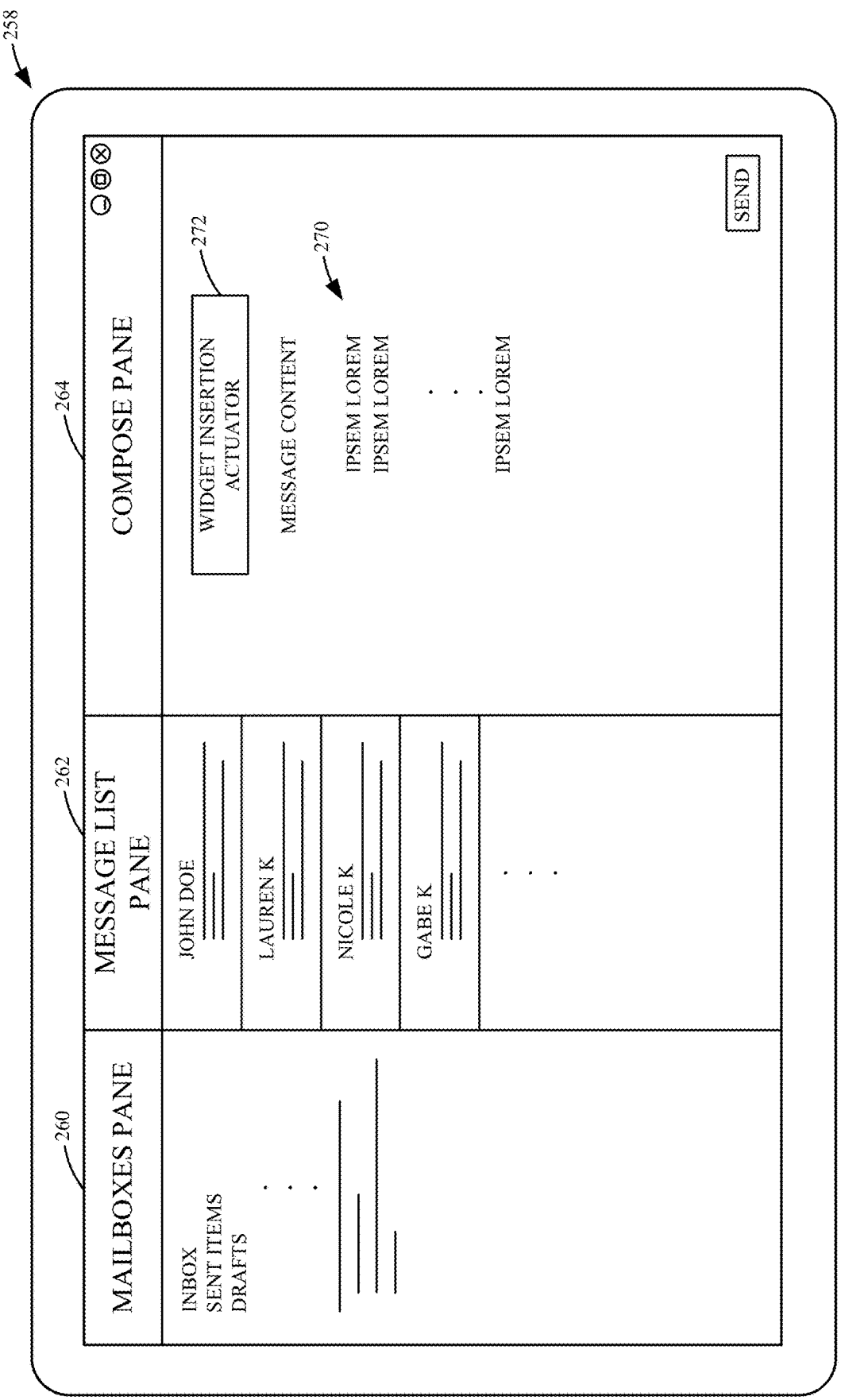
FIGS. 4A-4D show examples of user interface displays.

FIG. 4A shows one example of a user interface display 258 that can be generated using email system 126. It can be seen that user interface display 258 includes a mailboxes pane 260 that displays the various mailboxes in the user's email system. It includes a message list pane 262 that includes a list of messages, and it also includes a compose pane 264 in which user 116 can compose message content 270 in an email message. Compose actuators (such as a keyboard, dictation components, a keypad, etc.) can be used to input content 270 into the email message.

User interface display 258 also illustratively includes a widget insertion actuator 272. When user 116 actuates the widget insertion actuator 272, then user actuation detector 166 (in FIG. 2) activates the functionality of widget integration system 136. In one example, actuator 272 is always displayed when the compose pane 264 (or when another message viewing pane) is displayed in email system 126. In another example, actuator 272 is only displayed in certain contexts, when message content 270 contains certain content items, or in other circumstances.

It will also be noted that the functionality of widget integration system 136 can be activated in other ways as well. For instance, when content analysis detector 168 (shown in FIG. 2) detects certain items in message content 270, this may activate system 136 as well.

Figure 4B:
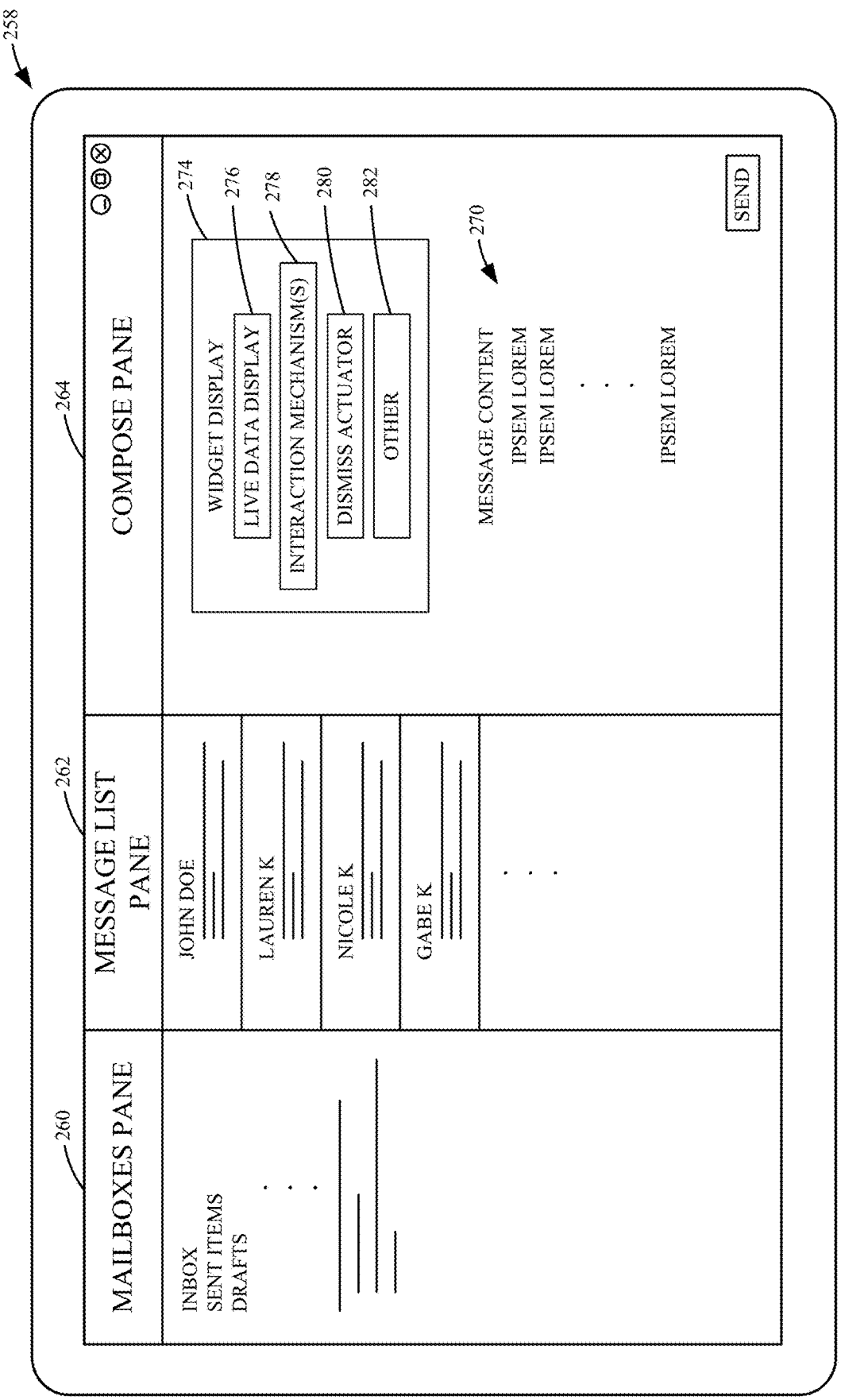

Once the functionality of widget integration system 136 is activated, widget identification logic 152 either automatically, or with the assistance of a user selection or guidance input, identifies the particular widget (or widgets) that the user wishes to insert into compose pane 264. In doing so, it may search a widget store that stores a list of indexed widget identifiers that identify various widgets. The index may index the widgets based on subject matter or other indexing criteria. The identifier may identify the widget and where it can be obtained or downloaded. The widget store (not shown) may be local to computing system 102 or remote, but accessible. The widget can be identified in other ways as well. Application installation logic 154 then obtains and installs the widget, and widget component 156 runs it. The running widget obtains data from the remote data service or data source 108-110 and returned data representation generator logic 162 illustratively generates a widget display displaying the returned data. Sizing/formatting logic 158 sizes it, formats it, and locates it on the compose pane, in-line with the other message content 270. FIG. 4B shows one example of this.

It can be seen in FIG. 4B that the compose pane 264 now includes widget display 274. Display 274 is at the top of message content 270, but displayed in-line with that message content. This is only one example. Display 274 may be located at the position of the user's cursor in message content 270, at the bottom of the compose pane 264, or at another location.

In the example shown in FIG. 4B, widget display 274 includes a live data display portion 276 that displays the data retrieved from the remote data service or data source 108-110. It can also include interaction mechanisms 278 that user 116 can interact with to perform functionality using the installed widget. It can include a dismiss actuator 280 that can be actuated by user 116 to dismiss the widget display 274. It can also include other actuators 282 that can be actuated to perform other actions.

Figure 4C:
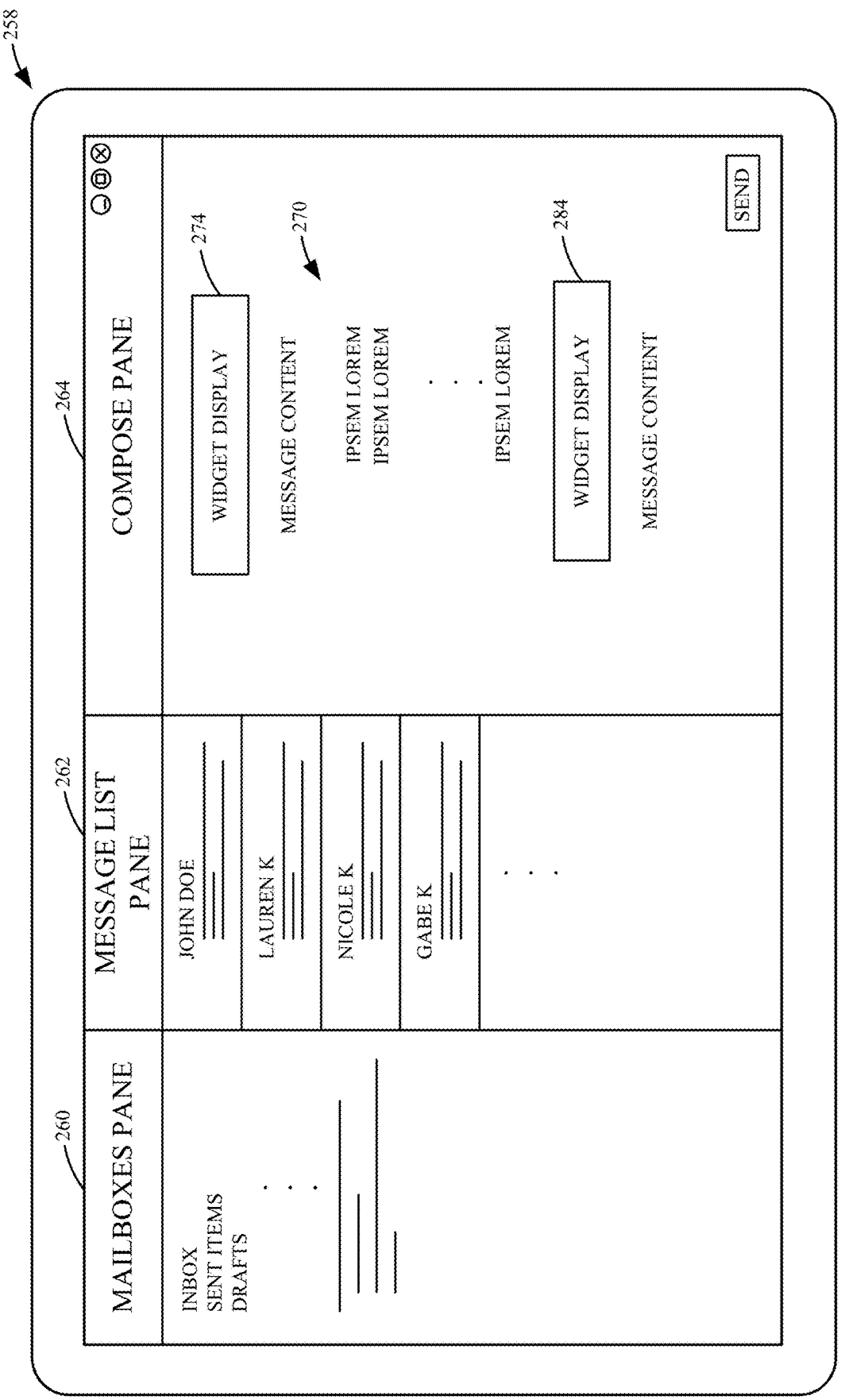

FIG. 4C shows another user interface display which is similar to that shown in FIG. 4B, and similar items are similarly numbered. However, FIG. 4C now shows that the user has used widget integration system 136 to include a second widget display 284 in message content 270. The two widget displays 274 and 284 can be displayed at different positions in-line with message content 270, or they can be displayed together. In the example shown in FIG. 4C, they are displayed at different locations, but both are still in-line with the message content 270 in compose pane 264.

Figure 4D:
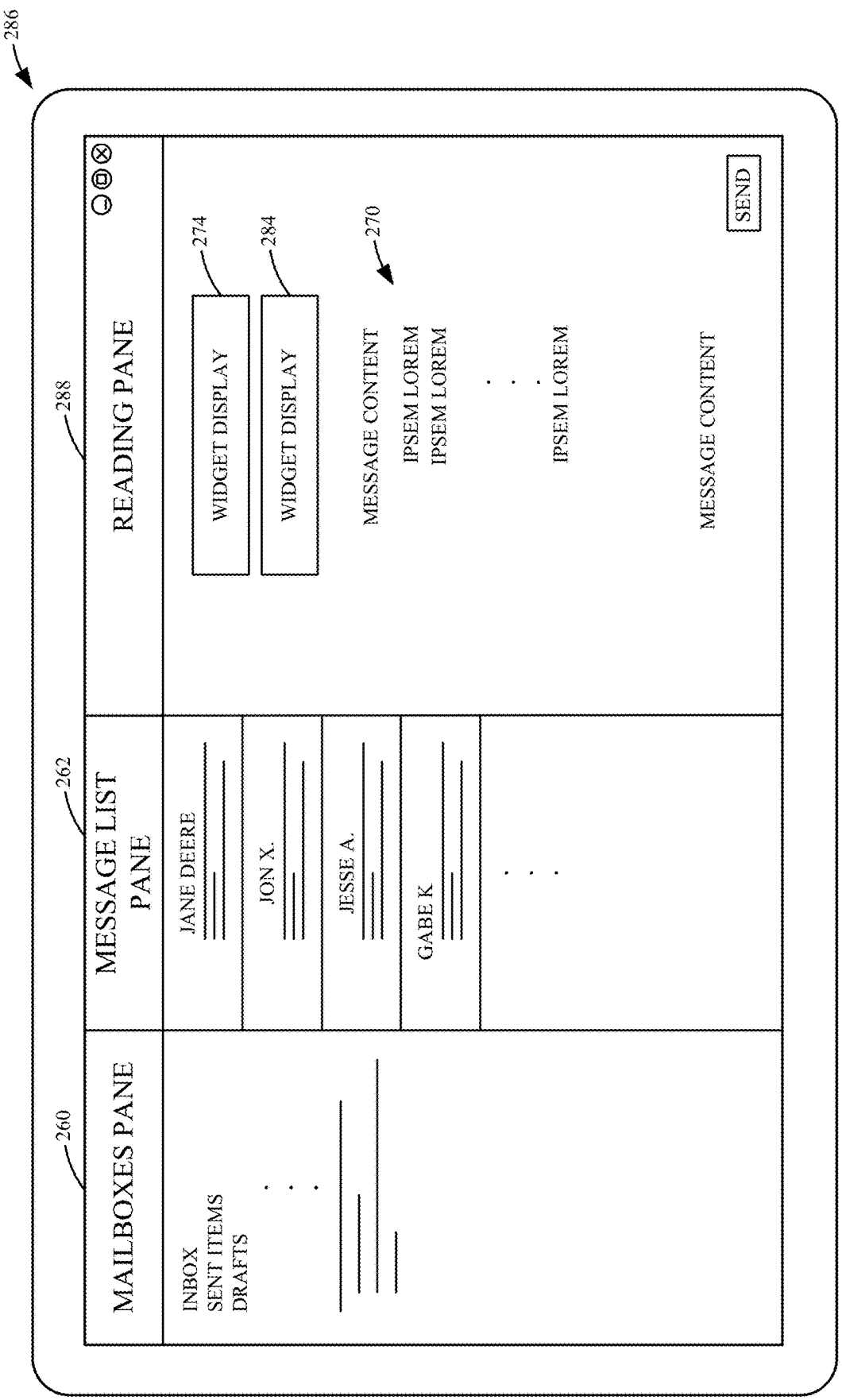

FIG. 4D shows one example of a user interface display 286. Display 286 is similar, in some ways, to display 258 shown in FIG. 4C, and similar items are similarly numbered. However, in the example shown in FIG. 4D, user 116 is the recipient of an email message with two integrated widgets, and display 286 shows a reading pane 288 in which the user is reading the email message with the integrated widgets. In the example shown in FIG. 4D, widgets 274 and 284 were inserted or integrated into an email message by another user (e.g., user 122). The message was then sent to email system 126 of user 116, and user 116 selected that message from the message list pane 262, for display in reading pane 288. In the example shown in FIG. 4D, the two widget displays 274 and 284 are displayed at the top of the email message, but still in-line with message content 270. It will be noted, however, that they may be displayed in other ways as well, such as separated within message content 270, at the bottom of message content 270, or in other locations.

Also, where a widget is inserted in a message display, but it is off the display screen, it can be automatically repositioned so it can be seen. For instance, assume that a message has an inserted widget and a recipient replies to the message. When that happens, the widget in the original message may get pushed downwardly off the display screen. Therefore, in one example, logic 162 may automatically reposition the widget from its location in the original message to the top of the reply message, so that it is visible when viewing the reply message as well. In another example, all widgets from all messages in a conversation thread can be repositioned so they are visible regardless of which message in the thread is being viewed. This can be done by logic 162 opening a display area at the top of the message, but in-line with the message content, and having the widget installed by logic 154 in that display area and run there by component 156. All of these examples are contemplated herein.

It can thus be seen that the present discussion greatly enhances the functionality of email system 126, and thus computing system 102. It reduces the processing and memory overhead needed for rendering, because the user need not navigate to a separate application in order to obtain data that the user will then type into, or copy and paste into, the email message. Thus, all of the user interface displays associated with searching for an application, obtaining data from a remote data service or data source, and then retrieving that data into the email message, are unneeded. Instead, the system automatically detects when a widget is to be inserted, and installs it in the display that is displaying the email message. This greatly enhances the user experience as well, as the user need not navigate to different sites to obtain desired data and attempt to incorporate that into the email message being composed.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
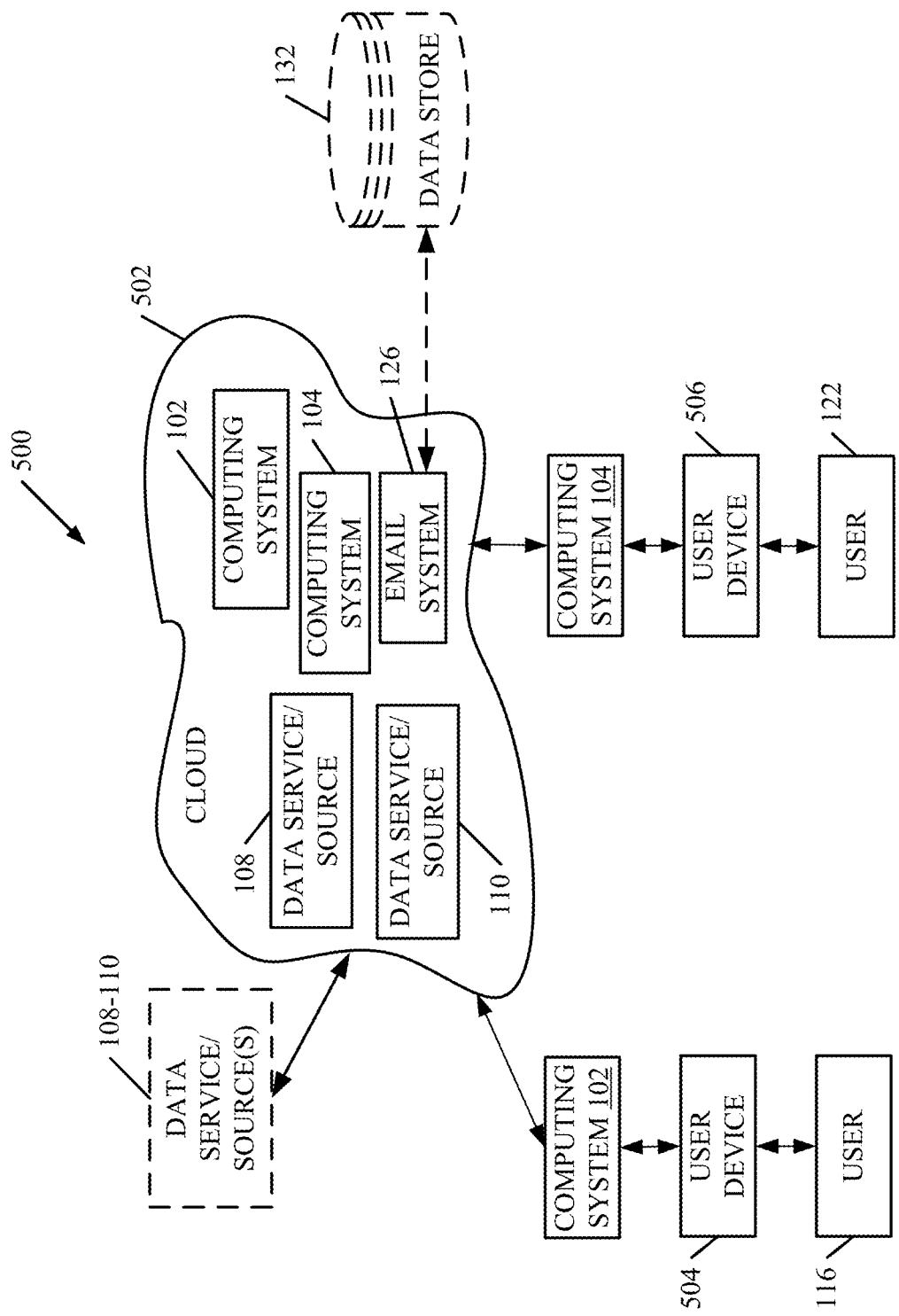
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that some items in architecture 500 can be located in cloud 502 (which can be public, private, or a combination where portions are public while others are private). For instance, one or more of computing systems 102 and 104 can be in cloud 502 or outside cloud 502. They are shown in both places in FIG. 5 to indicate this. Therefore, users 116-122 use user devices 504-506 to access those systems either directly or through cloud 502.

FIG. 5 also depicts another example of a cloud architecture. FIG. 5 shows that it is also contemplated that some elements of architecture 100 can be disposed in cloud 502 while others are not. By way of example, data store 132 can be disposed outside of cloud 502, and accessed through cloud 502. In another example, data sources/services 108-110 can be outside of cloud 502. Different portions of computing system 102 and 104 can be distributed inside or outside of cloud 502. Regardless of where they are located, they can be accessed directly by devices 504 and 506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
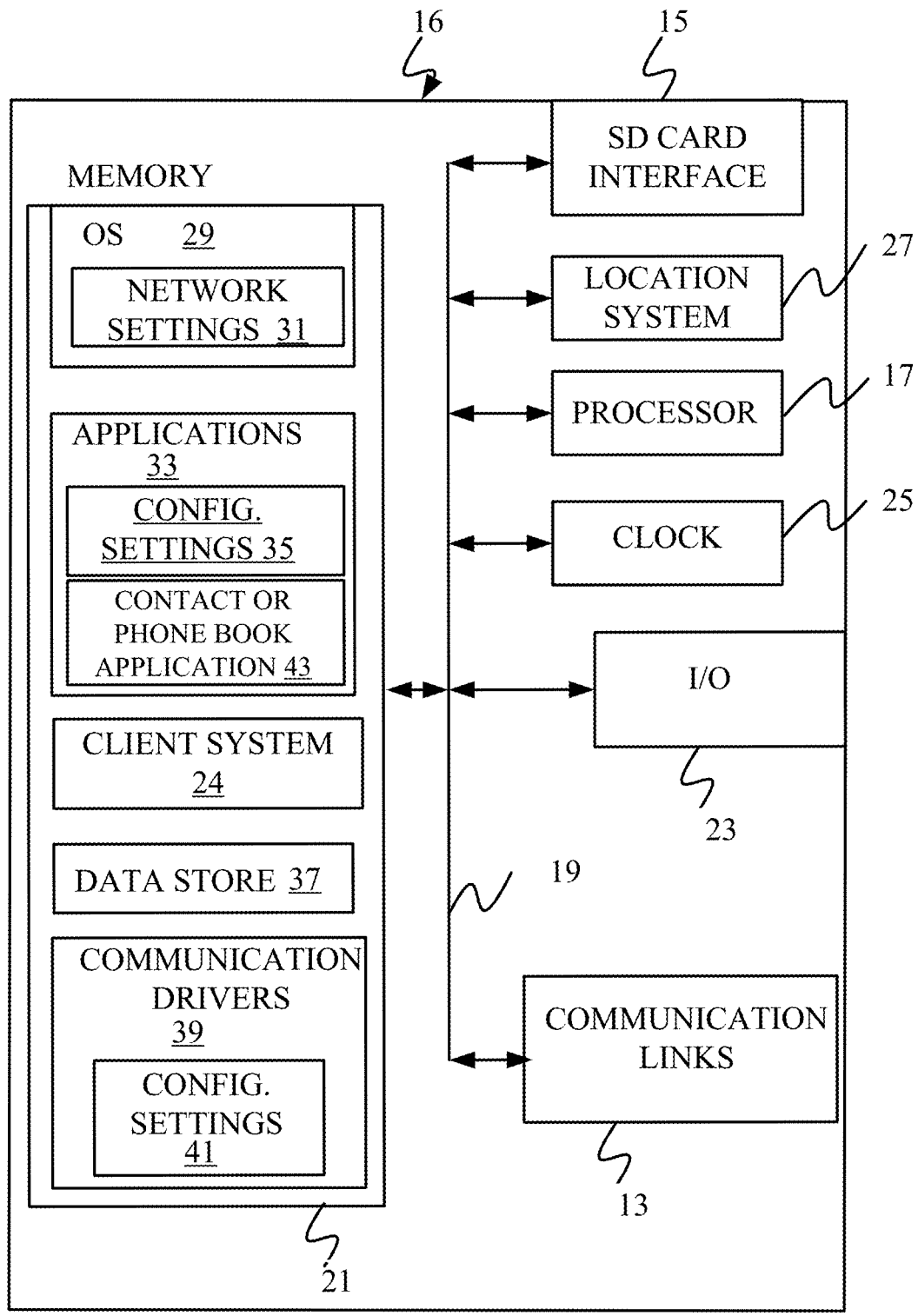
FIGS. 6-8 show examples of mobile devices that can be used in the architectures shown in the previous Figures.
Figure 7:
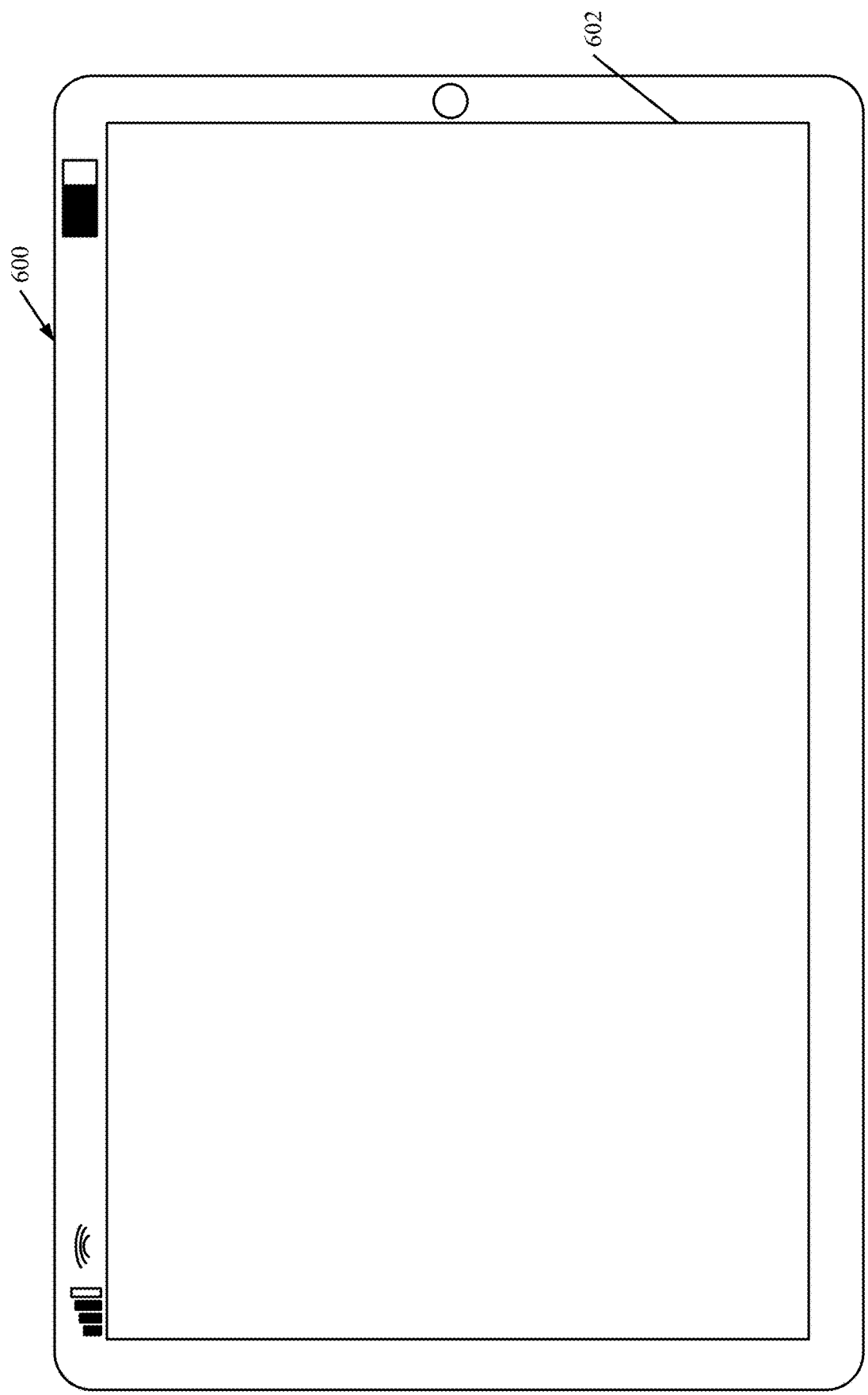
Figure 8:
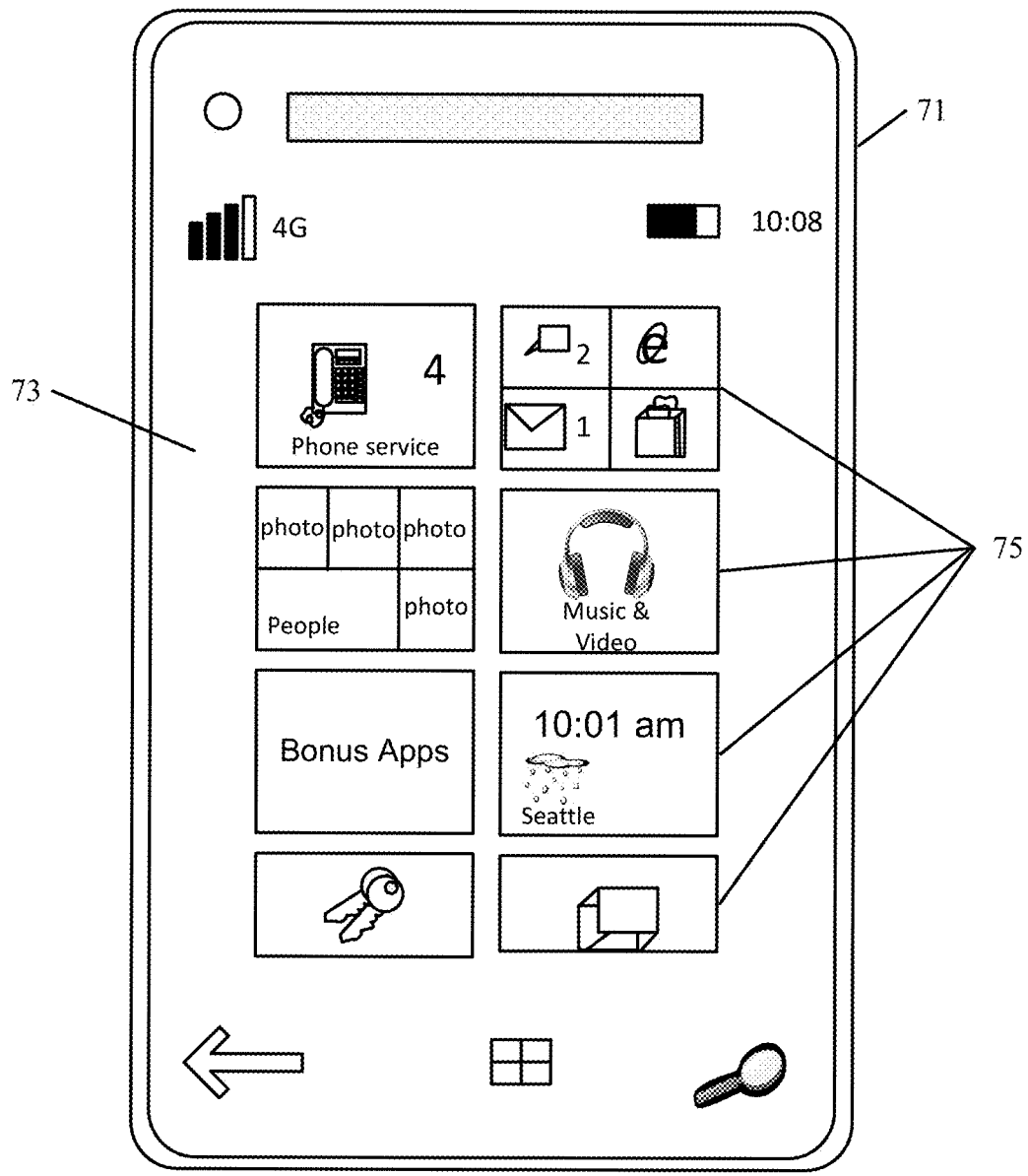

FIG. 6 is a simplified block diagram of one illustrative example of a handheld or mobile computing device that can be used as a user's or client's hand held device 16, in which the present architecture (or parts of it) can be deployed or which can interact with the present achicture. FIGS. 7-8 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or severs 124 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers 124), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1 and 2 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an electronic mail (email) system that displays an email user interface display with a display pane displaying message content of an email message;

a widget component that runs a widget to repeatedly obtain data from a remote data service; and returned data representation generator logic that generates a representation of the obtained data in a widget display and displays the widget display in line with the message content in the display pane.

Example 2 is the computing system of any or all previous examples wherein the widget display includes a user interaction mechanism, and further comprising:

widget interaction processing logic configured to detect actuation of the user interaction mechanism and control the computing system to perform an action based on the detected actuation.

FIG. 3 is the computing system of any or all previous examples and further comprising:

a content analysis detector that identifies a subject matter content of the message content.

Example 4 is the computing system of any or all previous examples and further comprising:

widget identification logic that identifies the widget based on the identified subject matter content.

Example 5 is the computing system of any or all previous examples and further comprising:

application installation logic that installs the identified widget in the email message in the email system.

Example 6 is the computing system of any or all previous examples wherein the email message is part of a conversation comprising a plurality of email messages and wherein the content analysis detector is configured to identify a subject matter content of the conversation.

Example 7 is the computing system of any or all previous examples and further comprising:

a recipient processing system that receives a received email message with a different widget integrated into the received email message, the widget component running the different widget when the received email message is displayed by the email system.

Example 8 is the computing system of any or all previous examples and further comprising:

widget integration detector logic that detects a widget insertion input to insert the widget into the email message.

Example 9 is the computing system of any or all previous examples wherein the email system is configured to display on the display pane a widget insertion actuator and wherein the widget integration detector comprises:

a user actuation detector configured to detect actuation of the widget insertion actuator.

Example 10 is a computer implemented method, comprising:

displaying an email user interface display, in an email system, with a display pane displaying message content of an email message;

running an application to repeatedly obtain data from a remote data service;

generating a representation of the obtained data in a first display; and displaying the first display in line with the message content on the display pane.

Example 11 is the computer implemented method of any or all previous examples wherein displaying the first display includes displaying a user interaction mechanism, and further comprising:

detecting actuation of the user interaction mechanism; and controlling a computing system to perform an action based on the detected actuation.

Example 12 is the computer implemented method of any or all previous examples and further comprising:

identifying a subject matter content of at least a portion of the message content; and identifying the application based on the identified subject matter content.

Example 13 is the computer implemented method of any or all previous examples and further comprising:

installing the identified application to run to display the obtained information in the email message in the email system.

Example 14 is the computer implemented method of any or all previous examples wherein the email message is part of a conversation comprising a plurality of email messages and wherein identifying a subject matter content comprises:

identifying a subject matter content of the conversation.

Example 15 is the computer implemented method of any or all previous examples and further comprising:

before running the application, detecting an application insertion input to insert the application into the email message.

Example 16 is the computer implemented method of any or all previous examples wherein displaying the email system user interface display comprises displaying on the display pane an application insertion actuator and wherein detecting an application input comprises:

detecting actuation of the application insertion actuator.

Example 17 is the computer implemented method of any or all previous examples and further comprising:

receiving a received email message with a different application integrated into the received email message; and running the different application when the received email message is displayed by the email system.

Example 18 is a computing system, comprising:

an electronic mail (email) system that displays an email user interface display with a display pane displaying message content of an email message;

an application component that runs an application to repeatedly obtain data from a remote data service;

returned data representation generator logic that generates a representation of the obtained data in a first display and displays the first display in line with the message content in the display pane; and application interaction processing logic configured to detect actuation of a user interaction mechanism on the first display and control the computing system to perform an action based on the detected actuation.

Example 19 is the computing system of any or all previous examples and further comprising:

a content analysis detector that identifies a subject matter content of the message content; and application identification logic that identifies the application based on the identified subject matter content.

Example 20 is the computing system of any or all previous examples and further comprising:

application installation logic that installs the identified application in the email message in the email system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

at least one processor; and memory storing instructions executable by the at least one processor, wherein the instructions, when executed, cause the computing system to:

display an email user interface display with a compose pane content that includes a user input mechanism;

based on user input detected through the user input mechanism, compose message content in the compose pane;

identify a subject matter content of the message content in the compose pane;

identify a widget based on the identified subject matter content;

display, on the email user interface display with the compose pane, a widget insertion actuator; and based on a detected user actuation of the widget insertion actuator, insert the widget into the email message;

run the widget to repeatedly obtain data from a remote data service;

display a widget display, that represents the widget inserted into the email message, in line with the message content in the compose pane;

dynamically update the widget display, displayed in line with the message content in the compose pane, to represent the repeatedly obtained data; and send the email message including, the message content and the inserted widget.

2. The computing system of claim 1 wherein the widget display includes a user interaction mechanism, and wherein the instructions, when executed, cause the computing system to:

detect actuation of the user interaction mechanism; and perform an action based 3n the detected actuation.

3. The computing system of claim 1 wherein the instructions, when executed, cause the computing system to;

display the widget insertion actuator in response to determining that the subject matter content of the message content activates widget insertion functionality.

4. The computing system of claim 1 wherein the instructions, when executed, cause the computing system to:

select the widget, front a plurality of widgets, based on the identified subject matter content.

5. The computing system of claim 1, wherein the instructions when executed, cause the computing system to:

install the identified widget in the email message.

6. The computing system of claim 1, wherein the instructions cause the computing system to:

position the wide display within the massage content based on a display area of the compose pane.

7. The computing system of claim 1 wherein the widget comprises a first widget, and the instructions, when executed cause the computing system to:

receive a second email message with a second widget, that is different than the first widget, integrated into the second email message;

run the second widget when the second email message is displayed by the computing system;

generate a reply email message that is in reply to the second email message and includes the second widget; and automatically reposition the second widget in the reply email message from a first position to a second position that is closer to a beginning of the reply email message tahn the first position.

8. A computer implemented method, comprising;

displaying an email user interface display, in an email system, with a compose pane displaying message content of an email message and including a user input mechanism configured to receive user input to compose the message content;

identifying a subject matter content of the message content displayed in the compose pane;

selecting a widget based on the identified subject matter content;

inserting the widget into the email message;

running the widget to repeatedly obtain data from a remote data service;

displaying a widget display, that represents the widget inserted into the email message, in line with the message content on the compose pane dynamically updating the widget display, displayed in line with the message content in the compose pane, to represent the repeatedly obtained data; and sending the email message including the message content and the inserted widget.

9. The computer implemented method of claim 8, and further comprising:

displaying, on the email user interface display, an indication of the selected widget along with a widget insertion actuator; and based on a detected user actuation of the widget insertion actuator, inserting the selected widget into the email message.

10. The computer implemented method of claim 9, wherein the widget insertion actuator is displayed on the compose pane.

11. The computer implemented method of claim 8 and further comprising:

installing the widget in the email message in the email system.

12. The computer implemented method of claim 11 wherein the email message is part of a conversation comprising a plurality of email messages and wherein identifying a subject matter content comprises:

identifying a subject matter content of the conversation.

13. The computer implemented method of claim 8 and further comprising:

before running the widget, detecting a widget insertion input to insert the widget into the email message.

14. The computer implemented method of claim 13 and further comprising displaying, on the compose pane, a widget insertion actuator and wherein detecting the widget insertion input comprises:

detecting actuation of the widget insertion actuator.

15. The computer implemented method of claim 8, wherein displaying the first display includes displaying a user interaction mechanism, and further comprising:

detecting actuation of the user interaction mechanism; and controlling a computing system to perform an action based on the detected actuation.

16. A computing system, comprising:

at least one processor; and memory storing instructions executable by the at least one processor, wherein the instructions, when executed, cause the computing system to:

receive an email message including a widget;

display an email user interface display with a display pane displaying message content of the received email message;

run the widget to repeatedly obtain data from a remote data service;

display a widget display, that represents the widget in the email message, line with the message content in the display pane, dynamically update the widget display, displayed in line the message content in the display pane, to represent the repeatedly obtained data;

generate a reply email message that is in reply to the received email message and includes the widget;

automatically reposition the widget in the reply email message from a first position to a second position, and send the reply email message that includes:

the message content, and a set of data represented in the repositioned widget display.

17. The computing system of claim 16 wherein the instructions cause the computing system to:

identify a subject matter content of the message content; and select the widget based on the identified subject matter content.

18. The computing system of claim 16, wherein the second position is closer to a beginning of the reply email message compared to the first position.

19. The computing system of claim 16, wherein the received email message includes a plurality of widgets, and the instructions cause the computing system to:

automatically reposition the plurality of widgets in the reply email message.

20. The computer implemented method of claim 8, and further comprising positioning the widget display within the message content based on a display area of the compose pane.

* * * * *